(12) United States Patent
Fujieda et al.

(10) Patent No.: US 6,937,184 B2
(45) Date of Patent: Aug. 30, 2005

(54) MILLIMETER WAVE RADAR

(75) Inventors: Tadashi Fujieda, Mito (JP); Hiroshi Kuroda, Hitachi (JP); Terumi Nakazawa, Naka-machi (JP); Mitsushige Suzuki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 7 days.

(21) Appl. No.: 10/390,596

(22) Filed: Mar. 19, 2003

(65) Prior Publication Data

US 2004/0036645 A1 Feb. 26, 2004

(30) Foreign Application Priority Data

Aug. 22, 2002 (JP) ........................................ 2002-241292

(51) Int. Cl.$^7$ ........................... G01S 7/28; H01Q 17/00; H01Q 1/42
(52) U.S. Cl. ............................. 342/70; 342/1; 342/198; 343/872
(58) Field of Search .............................. 342/1, 4, 5, 6, 342/11, 70–74, 159, 198; 343/872, 873; 333/211

(56) References Cited

U.S. PATENT DOCUMENTS

| 3,196,442 A | | 7/1965 | Leffelmann et al. | |
| 5,085,931 A | * | 2/1992 | Boyer et al. | 428/328 |
| 5,099,242 A | * | 3/1992 | Jaggard et al. | 342/1 |
| 5,275,880 A | * | 1/1994 | Boyer et al. | 428/328 |
| 6,111,551 A | | 8/2000 | Schmidt et al. | |
| 6,496,138 B1 | * | 12/2002 | Honma | 342/70 |
| 2001/0040524 A1 | * | 11/2001 | Suzuki et al. | 342/70 |

FOREIGN PATENT DOCUMENTS

| EP | 1 118 872 | 7/2001 | |
| JP | 61296287 A | * 12/1986 | ........... G01S/13/88 |
| JP | 10-126146 | 5/1998 | |
| JP | 2001 127523 | 3/2001 | |

OTHER PUBLICATIONS

European Search Report.

* cited by examiner

*Primary Examiner*—Bernarr E. Gregory
*Assistant Examiner*—Isam Alsomiri
(74) *Attorney, Agent, or Firm*—Crowell & Moring LLP

(57) ABSTRACT

A millimeter wave radar for the purpose of automatic operation or collision prevention of a vehicle which solves the problem that a side lobe of a transmitted electromagnetic wave is reflected by surrounding bodies and the reflected wave is received, with the result that unnecessary bodies may also be detected. A layer higher in dielectric loss than a radome or a magnetic loss layer and a conductor layer in a mesh form are embedded in a part of the inside surface of the radome, whereby it is possible to provide a millimeter wave radar which is light in weight, excellent in weathering performance, inexpensive, and excellent in detection performance.

17 Claims, 8 Drawing Sheets

MILLIMETER WAVE RADAR

BACKGROUND OF THE INVENTION

The present invention relates to a millimeter wave radar mounted on a vehicle.

A millimeter wave radar is used for the purpose of automatic operation or collision prevention of a vehicle. The millimeter wave radar is a system for transmitting a millimeter electromagnetic wave in a desired direction, receiving the reflection of the transmitted wave, and preliminarily detecting a body which may act as an obstacle. On the other hand, the millimeter wave radar has the problem that the side lobe of the transmitted electromagnetic wave is reflected by surrounding bodies, with the result that unnecessary bodies would also be detected. As a countermeasure against this problem, a technique of mounting a metallic plate or an absorber to the periphery of the transmission-reception antenna surface in the antenna unit in the state of projecting from the surface of the transmission-reception antenna so as thereby to reduce the side lob has been described, for example, in Japanese Patent Laid-open No. 10-126146.

However, according to the technique described in Japanese Patent Laid-open No. 10-126146, since the metallic plate or absorber mounted to the periphery of the transmission-reception antenna is separate from the radome, the structure and production process of the antenna unit become complicated. In addition, the metallic plate or absorber itself must have a certain degree of strength, so that the metallic plate or absorber itself must be thick to a certain extent, resulting in the problem of an increase in weight. Furthermore, since the metallic plate or absorber is exposed to rain and winds, it has still the problem in weathering performance.

SUMMARY OF THE INVENTION

In view of the above, it is an object of the present invention to provide a millimeter wave radar which is light in weight, excellent in weathering performance, inexpensive, and excellent in detection performance.

In order to solve the above problems, the present invention provides a millimeter wave radar comprising an antenna base having a transmission-reception antenna, a housing for fixing the antenna base, and a radome covering the antenna base, characterized in that the radome is formed integral with an electromagnetic wave absorbing layer.

BRIEF DESCRIPTION OF THE DRAWINGS

Other objects and advantages of the invention will become apparent from the following description of embodiments with reference to the accompanying drawings in which.

DESCRIPTION OF THE PREFERRED EMBODIMENTS

Figure 1:
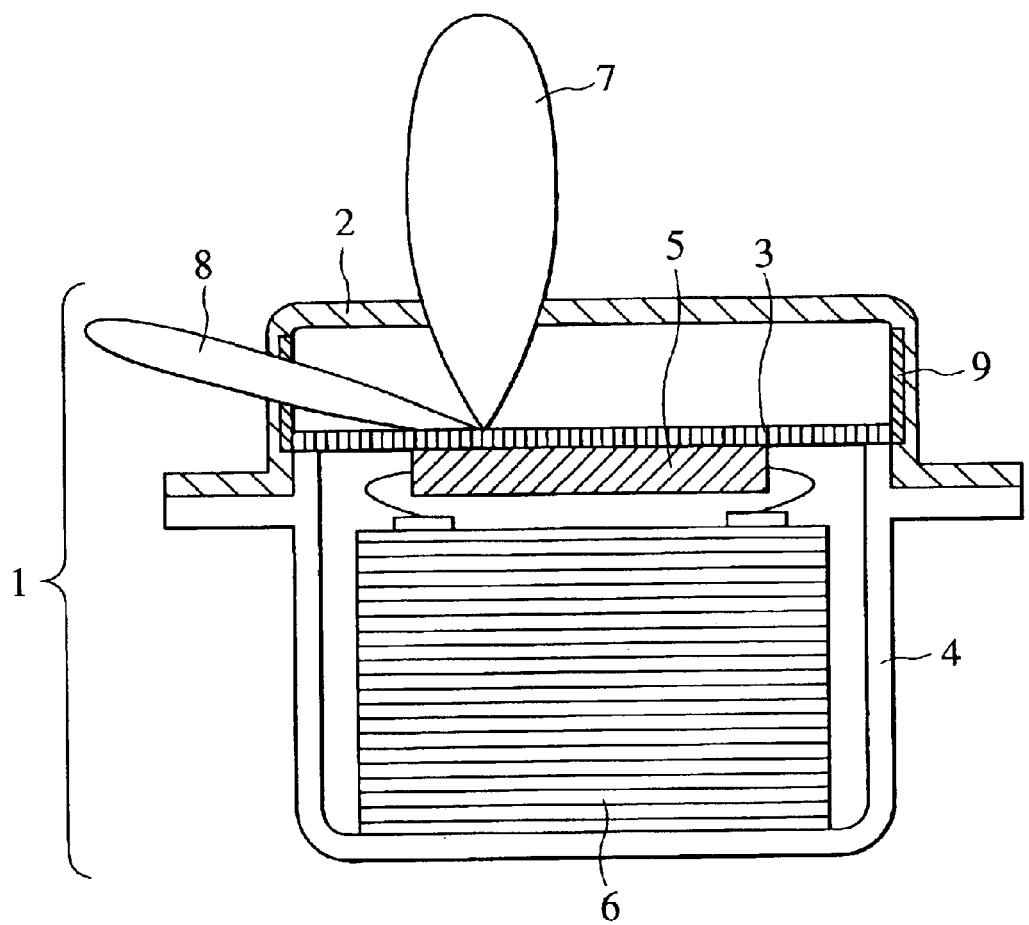
FIG. 1 is a cross-sectional view of a millimeter wave radar and an illustration of a side lobe emitted from a transmission-reception antenna.

Now, embodiments of the present invention will be described below referring to the drawings.

Embodiment 1

FIG. 1 is a cross-sectional view of a millimeter wave radar. The millimeter wave radar shown in FIG. 1 includes a radome 2, an antenna base 3 in which a transmission-reception antenna is mounted, a control circuit 6, an RF module 5, and a housing 4 for fixing the antenna base 3 and accomodating the control circuit 6 and the RF module therein. Reference numeral 7 in FIG. 1 shows a main beam of the transmitted electromagnetic wave transmitted from the transmission-reception antenna, and reference numeral 8 shows a side lobe of the transmitted electromagnetic wave transmitted from the transmission-reception antenna, in the form of conceptual illustration for easier understanding. The transmission-reception antenna herein means an antenna arrangement so constituted as to be capable of transmission and reception, and the case where a transmission antenna and a reception antenna are separately arranged should be also included in the meaning of the term "transmission-reception antenna".

In FIG. 1, the RF module 5 and the control circuit 6 are contained in the housing 4, and the radome 2 for protecting the antenna surface from flying stones, rain and the like is mounted over the entire surface on the front side of the antenna base 3.

The radome must be formed of a material which transmits electromagnetic waves therethrough without reflection or absorption, and is selected to have a low dielectric constant and a low dielectric loss. More specifically, the material of the radome preferably has a dielectric constant at 76.5 GHz of not more than 3.0 and a dielectric loss tangent of not more than 0.003. Simultaneously, it is desirable that the material of the radome be excellent in chemical resistance, mechanical strength, cost, processability and the like.

Generally, the millimeter wave radar is disposed in the inside of a vehicle. As shown in FIG. 1, however, the side lobe 8 of the electromagnetic wave transmitted from the transmission-reception antenna passed through a side surface portion of the radome to be reflected by members constituting the vehicle therearound, and the reflected wave again enters the radome to be received by the transmission-reception antenna, whereby unnecessary bodies may also be detected.

Figure 2:
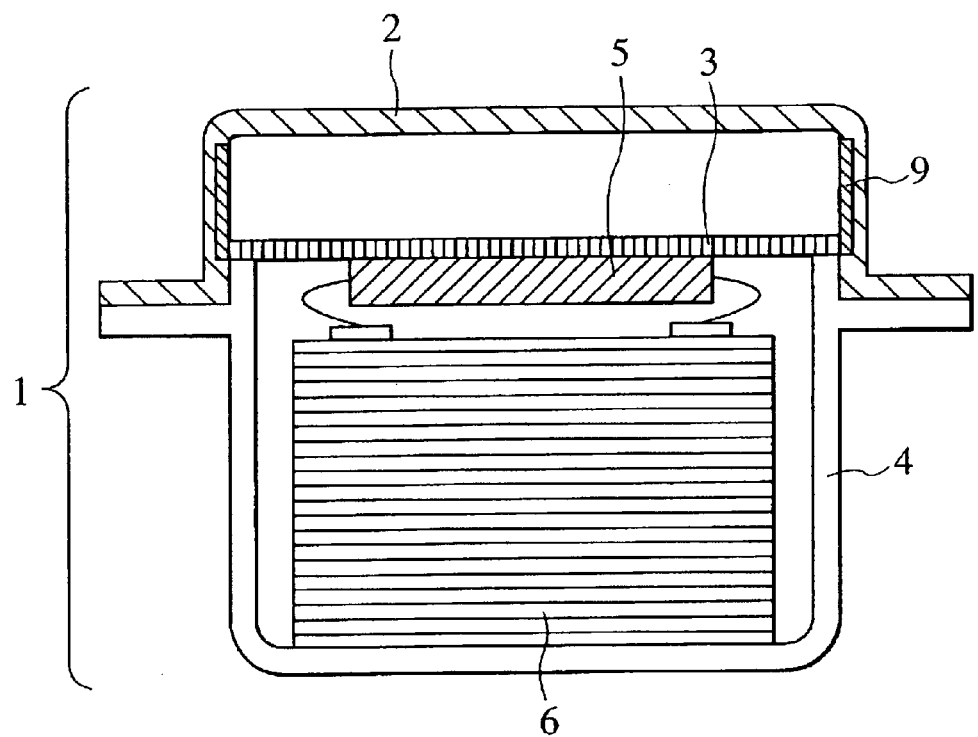
FIG. 2 is a cross-sectional view of a millimeter wave radar according to Embodiment 1.

FIG. 2 is a cross-sectional view of the millimeter wave radar according to the present embodiment. In the millimeter wave radar device shown in FIG. 2, a layer having a dielectric loss higher than that of the radome or a magnetic loss layer 9 (electromagnetic wave absorbing layer) 2 is disposed at a part of the side surface portion of the radome 2, whereby the side lobe transmitted from the transmission-reception antenna is absorbed, and the permeating wave is reduced. With this constitution, it is possible to design the millimeter wave rador with a thickness necessary for absorbing the side lobe, without requiring the strength of the side lobe absorbing means itself, so that the problem of an increase in weight can be obviated. Further, in the millimeter wave radar according to the present embodiment, since the means for absorbing the side lobe is provided at a part of the radome, the side lobe can be absorbed without increasing the structure and production steps of the antenna unit (the antenna and peripheral members), and the antenna unit would not be exposed directly to winds and rain. In addition, from a different point of view, the side lobe absorbing means (electromagnetic wave absorbing layer) and the radome are formed as one body with each other, so that the side lobe absorbing means is registered with the antenna base with ease.

Thus, a millimeter wave radar light in weight, excellent in weathering performance, inexpensive, and excellent in detection performance can be realized.

Embodiment 2

Figure 3:
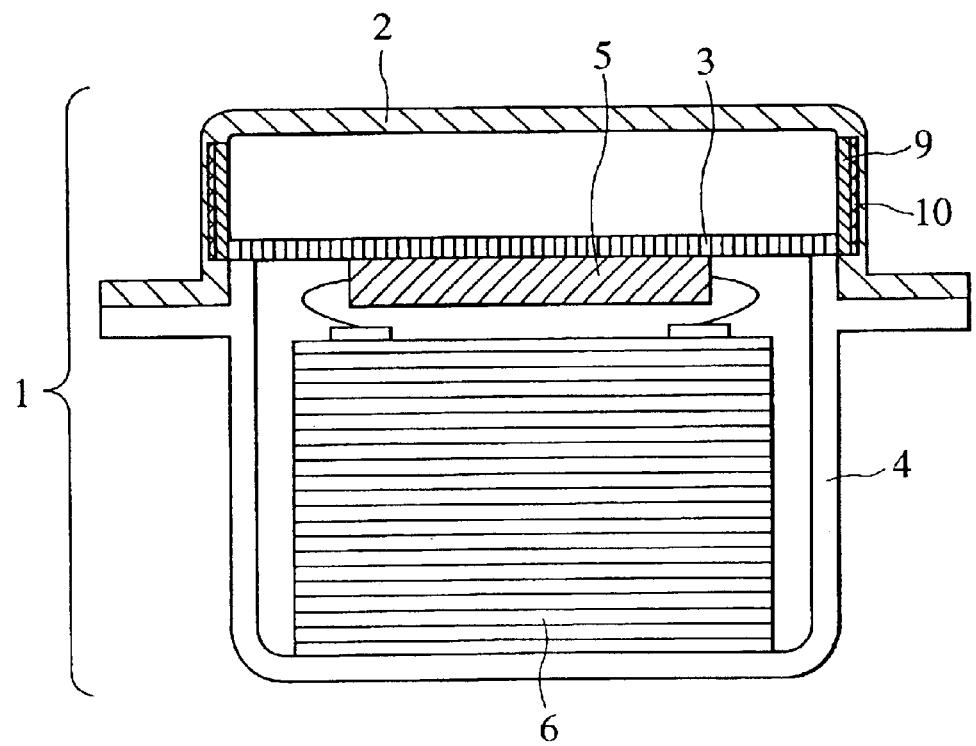
FIG. 3 is a cross-sectional view of a millimeter wave radar according to Embodiment 2.

A cross-sectional view of a millimeter wave radar according to the present embodiment is shown in FIG. 3. The difference between the millimeter wave radar according to the present embodiment and the millimeter wave radar according to Embodiment 1 lies in that a layer having a dielectric loss higher than that of the radome or a magnetic loss layer 9 is disposed as a side lobe absorbing means and, further, a conductor layer 10 is disposed on the outside of thereof. With such a constitution, the permeating wave to the outside of the radome can be completely removed while restraining the reflection of the transmitted electromagnetic wave on the inside surface of the radome. Such a constitution is a constitution of a matching type electromagnetic wave absorber backed with a reflector. Absorption mechanisms include a multiple reflection effect by critical coupling between the surface reflection wave and the multiple reflection waves in the electromagnetic wave absorber, and an attenuating effect due to dielectric loss or magnetic loss in the electromagnetic wave absorber.

In general, for a perpendicular reflected wave, a return loss (R.L. (dB)) of electromagnetic wave is expressed by the following equation, and the complex permittivity, the complex permeability and the thickness of the electromagnetic wave absorbing layer for obtaining a desired return loss are determined univocally.

$$R.L.=-20 \log|Z_{in}-1/Z_{in}+1| \quad (1)$$

where $Z_{in}$ is the characteristic impedance of the absorber.

$$Z_{in}=(\mu_r/\epsilon_r)^{0.5} \tan h\{j2\pi ft(\mu_r\epsilon_r)^{0.5}\} \quad (2)$$

where $\epsilon_r$ is the complex permittivity ($\epsilon_r=\epsilon'+j\epsilon''$), $\mu_r$ is the complex permeability ($\mu_r=\mu'+j\mu''$), f is the frequency, and t is the thickness (m) of the absorber.

The layer having a dielectric loss higher than that of the radome is preferably formed of a carbon material, and the magnetic loss layer is preferably formed of a material obtained by dispersing a hexagonal ferrite in a material having an electric resistivity higher than that of the hexagonal ferrite. The dielectric loss tangent of the layer higher in dielectric loss than the radome is preferably not less than 0.003 at 76.5 GHz. Where the material having the higher electric resistivity is an insulating high molecular weight material such as rubber and resin, the carbon material is more preferable than the hexagonal ferrite, in view of dispersibility of the filler. The carbon material is preferably selected from at least one among the group consisting of carbon nanotube, carbon microcoil, shungite carbon, carbon black, exfoliated graphite, and carbon fiber, and, in view of electromagnetic wave absorption characteristics, carbon nanotube, shungite carbon, and expanded graphite are more preferable. Further, for the hexagonal ferrite, a hexagonal ferrite obtained by substituting a part of Fe in an M-type hexagonal ferrite with Ti, Mn, Al or the like, such as $BaFe_{12}O_{19}$ and $SrFe_{12}O_{19}$, are preferable. In addition, the material having the higher electric resistivity may be the same material as that of the radome, which is convenient in view of producibility.

As the conductor layer, a material having a high conductivity may be used without special limitations, and examples of the usable material include metallic materials, carbon materials, and materials obtained by dispersing these fillers in a high molecular weight material at a high filling content. Of these, a material in a mesh form is more preferable, from the viewpoints of lightness in weight and adhesion to the resin. In addition, where the wavelength of the electromagnetic wave is $\lambda$, when the size of the mesh is set to be not more than $\lambda/4$, the electromagnetic wave is not transmitted through the openings of the mesh, and the conductor layer can fully function as a reflector. Since the conductor layer is formed as a part of the radome, there are the merits that it is unnecessary to increase the thickness of the conductor layer excessively in consideration of the strength of the conductor layer itself, a decrease in weight can be contrived, and the antenna unit is fabricated with ease.

Embodiment 3

Figure 4:
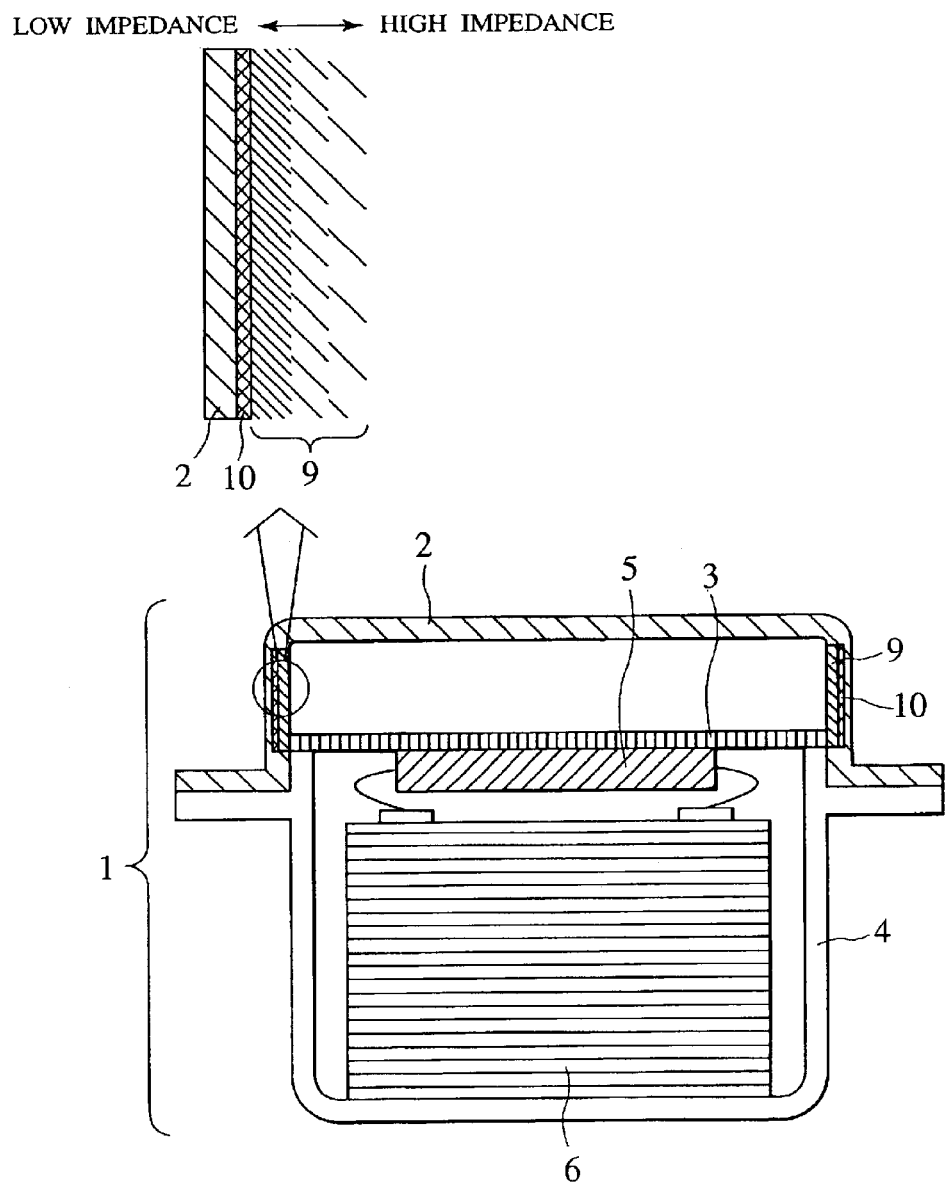
FIG. 4 is a cross-sectional view of a millimeter wave radar according to Embodiment 3.

A cross-sectional view of a millimeter wave radar according to the present embodiment is shown in FIG. 4. The present embodiment resides in that the impedance to the transmitted electromagnetic wave of a layer higher in dielectric loss than the radome or a magnetic loss layer 9 is gradually reduced, from the side of the layer higher in dielectric loss than the radome or the magnetic loss layer 9 toward a conductor layer 10 (from the inside to the outside of the radome). To be more specific, the layer higher in dielectric loss than the radome or the magnetic loss layer 9 is composed of a multiplicity of layers differing in the impedance. With this constitution, it is possible to enhance the electromagnetic wave absorption characteristic for the electromagnetic wave transmitted from the transmission-reception antenna and obliquely incident on the inside surface of the radome (oblique incident wave).

In this case, if the outermost layer, on the conductor layer side, of the layer higher in dielectric loss than the radome or the magnetic loss layer 9 has sufficient conductivity, the conductor layer can be omitted. More specifically, it suffices to gradually increase the complex permittivity or complex permeability of the layer higher in dielectric loss than the radome or the magnetic loss layer, from the electromagnetic wave incidence side toward the side of the conductor layer 10. For this purpose, it suffices to gradually increase the filling content of the carbon material or the hexagonal ferrite in the material having an electric resistivity higher than that of the carbon material or the hexagonal ferrite.

Embodiment 4

Figure 5A:
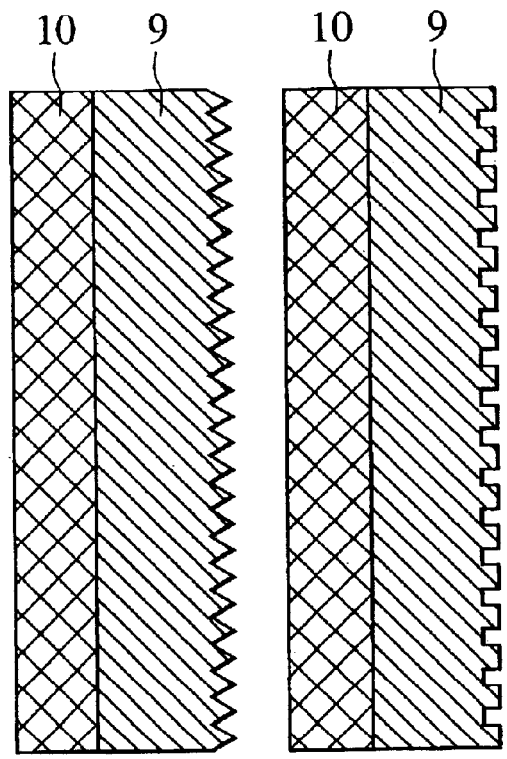
FIGS. 5A and 5B are cross-sectional views of a millimeter wave radar according to Embodiment 4.
Figure 5B:
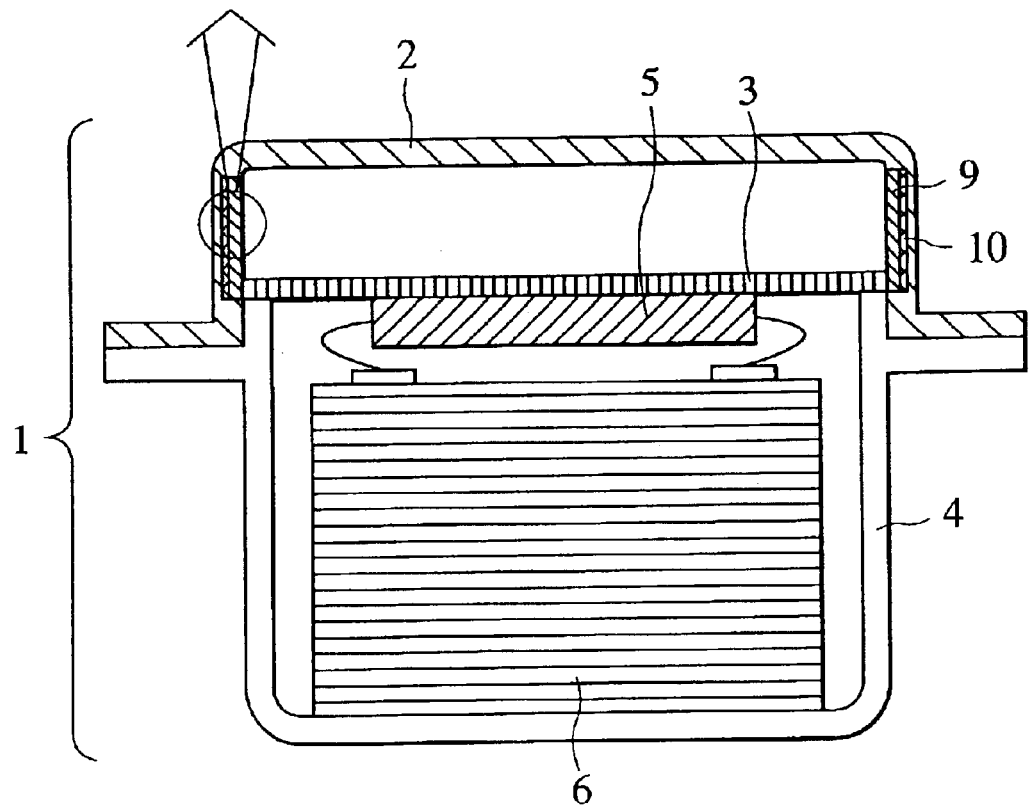

A cross-sectional view of a millimeter wave radar according to the present embodiment is shown in FIGS. 5A and 5B.

The millimeter wave radar according to the present embodiment has a structure in which a layer higher in dielectric loss than the radome or a magnetic loss layer 9 is provided with recesses and projections in its surface. This allows to enhance the electromagnetic wave absorption characteristic for the oblique incident wave. Incidentally, this embodiment includes a mode in which the conductor layer is omitted, as shown in Embodiment 1.

Embodiment 5

Figure 6:
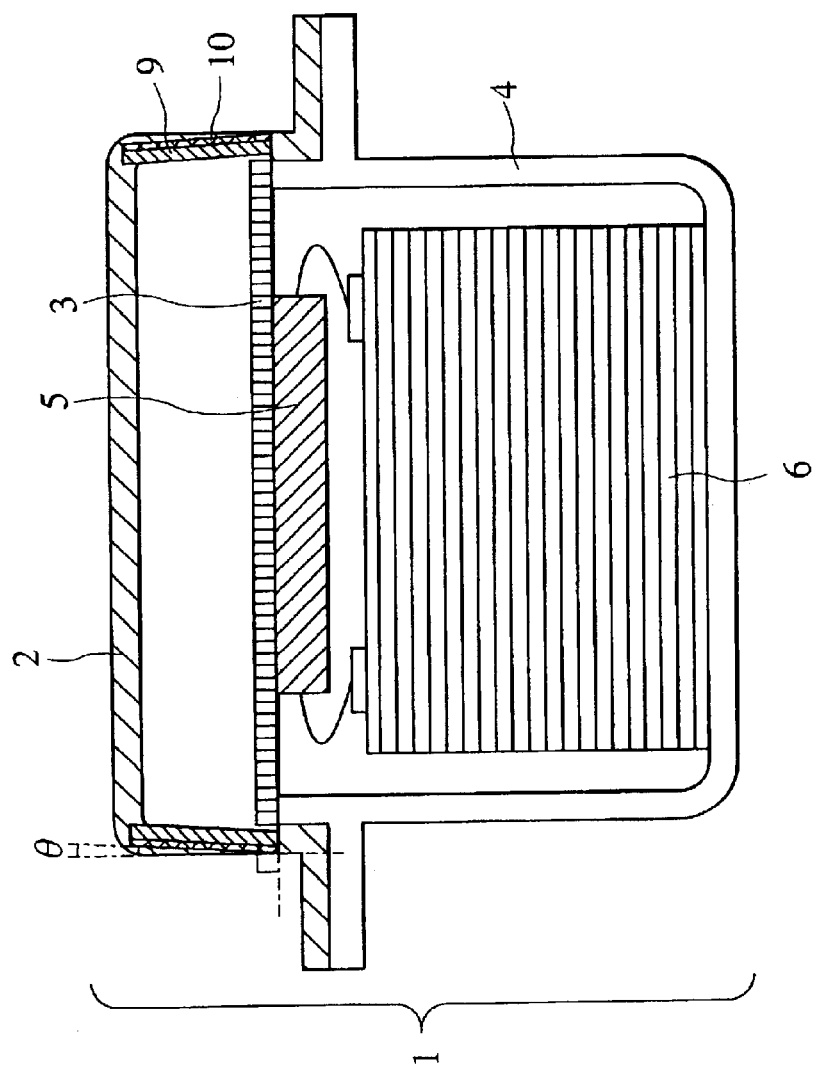
FIG. 6 is a cross-sectional view of a millimeter wave radar according to Embodiment 5.

A cross-sectional view of a millimeter wave radar according to the present embodiment is shown in FIG. 6.

The millimeter wave radar according to the present embodiment has a structure in which a layer higher in dielectric loss than the radome or a magnetic loss layer 9 and the conductor layer 10 are inclined by an angle θ, relative to the direction of normal to the antenna base 3. This allows to enhance the electromagnetic wave absorption characteristic for the oblique incident wave. Incidentally, this embodiment includes a mode in which the conductor layer is omitted, as shown in Embodiment 1.

Embodiment 6

Figure 7:
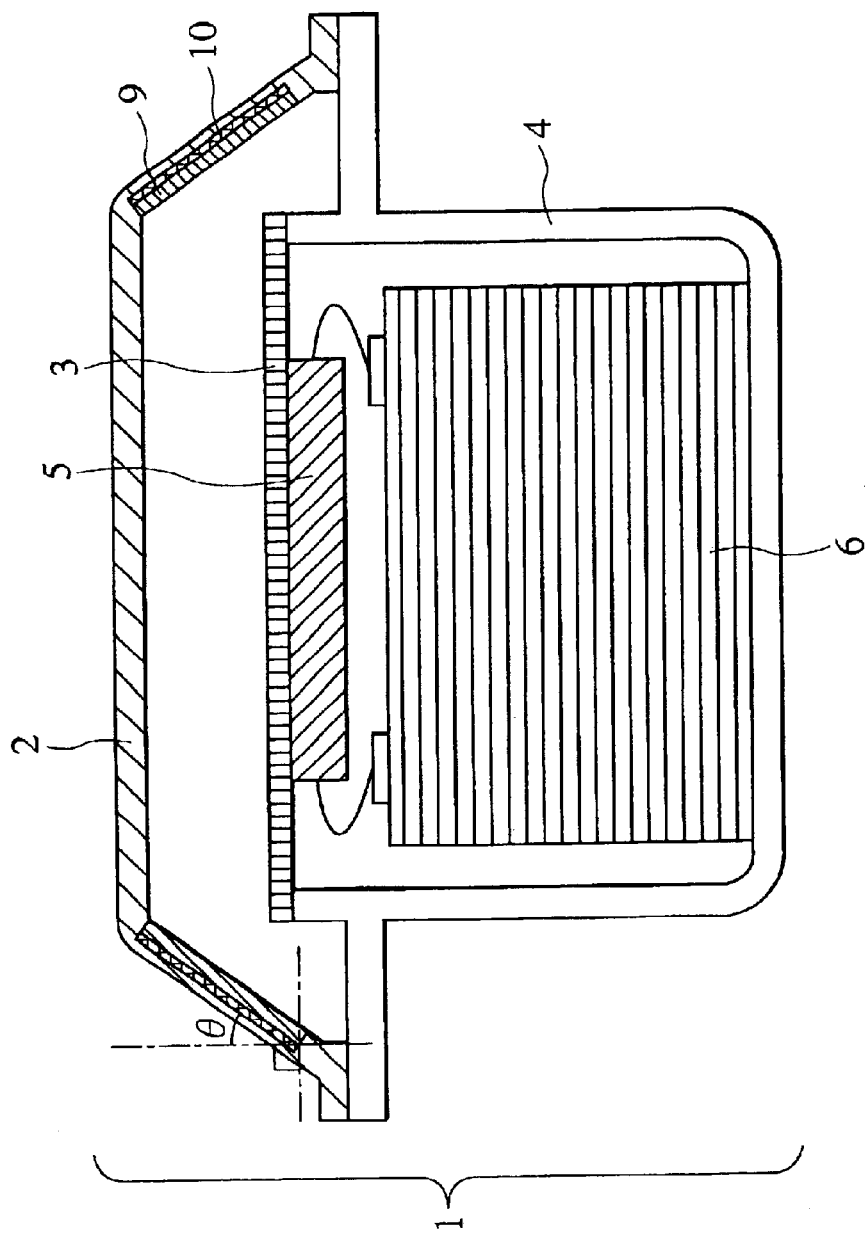
FIG. 7 is a cross-sectional view of a millimeter wave radar according to Embodiment 6.

A cross-sectional view of a millimeter wave radar according to the present embodiment is shown in FIG. 7.

The millimeter wave radar according to the present embodiment has a structure in which a side surface portion of a radome is also inclined by an angle θ, relative to the direction of normal to the plane of the antenna base 3. With such a shape, not only the oblique incidence characteristic can be enhanced, but also the thickness of the side portion of the radome can be made constant. Thus, variations in the strength of the rarome itself due to variations in thickness can be restrained. Incidentally, the production of the radome having a layer higher in dielectric loss than the radome or a magnetic loss layer 9 is facilitated. In the millimeter wave radar according to the present embodiment, it is useful to prevent the layer from covering the antenna base in order to secure the amount of a main beam emitted from the transmission-reception antenna in the antenna base 3. This is true in the case where the side surface portion of the radome is inclined and a front portion of the radome has an area larger than the antenna base 3 has, whereby the amount of the main beam can be secured more.

Embodiment 7

Figure 8:
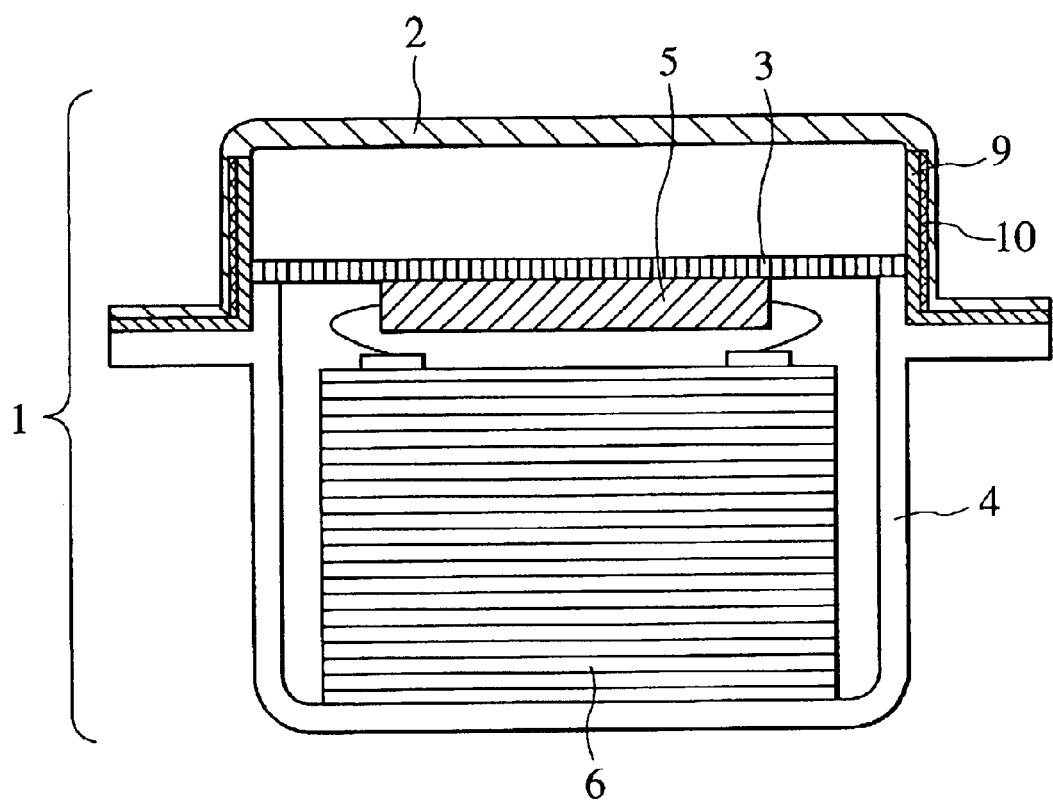
FIG. 8 is a cross-sectional view of a millimeter wave radar according to Embodiment 7.

A cross-sectional view of a millimeter wave radar according to the present embodiment is shown in FIG. 8.

The millimeter wave radar according to the present embodiment has a structure in which a layer higher in dielectric loss than a radome or a magnetic loss layer 9 is formed of a flexible material, and is disposed to extend up to the portion of joint between the radome 2 and a housing 4. With this constitution, the layer functions as a substitute for a packing which has been used for securing hermetic seal property of the inside of the radome and the inside of the housing, so that the production step for inserting the packing can be omitted.

Embodiment 8

The present embodiments illustrate a method of making a millimeter wave radar according to the present invention.

Examples of a method for making a layer higher in dielectric loss than a radome or a magnetic loss layer and a conductor layer on the inside surface of the radome include, for example, a method in which materials formed in a sheet shape are made to adhere to the inside surface of the radome by an adhesive or the like, and a method of applying coating materials to the radome. Where it is desired to retain the thickness of the radome, the method of adhesion to the inside surface of the radome or the method of applying the coating material is useful. From the viewpoints of producibility and production cost, however, a method of integrally molding the layer higher in dielectric loss than the radome or the magnetic loss layer and the conductor layer by injection molding or the like is more preferable.

Figure 9:
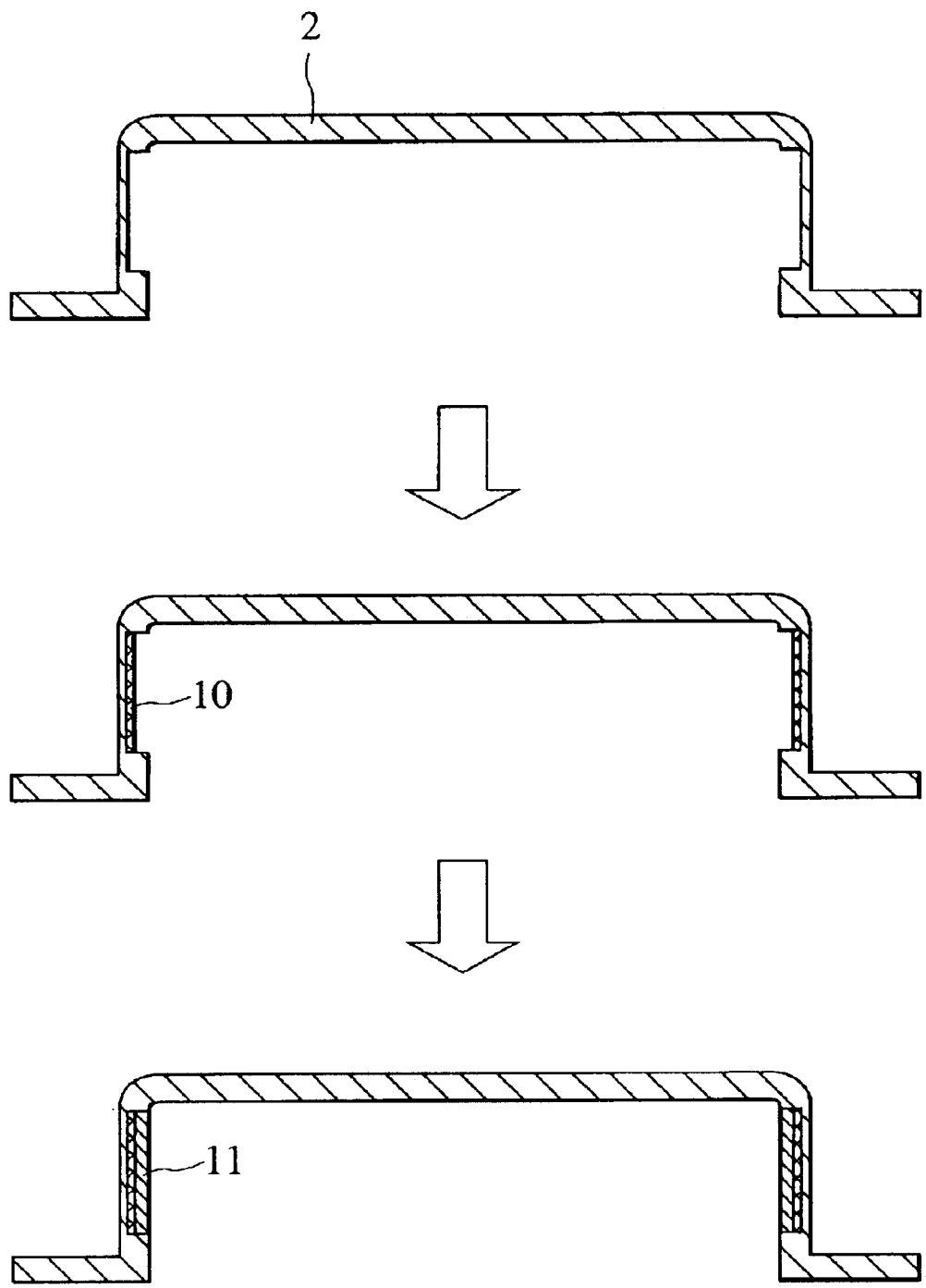
FIG. 9 is an illustration of a method of making a radome.

FIG. 9 shows a method of integrally molding a radome by injection molding.

After a radome main body is formed by injection molding, a conductor layer 10 is formed. The conductor layer 10 may be formed by inserting the conductor layer 10 onto the inside surface of the radome as it is, or by plating, ion plating, vapor deposition or the like. Thereafter, a layer higher in dielectric loss than the radome main body or a magnetic loss layer 9 is formed by injection molding and is then formed integral with the conductor layer 10. In the case where the conductor layer 10 is omitted, it is possible to cope with the case by omitting the relevant steps.

After the radome is formed by the above-mentioned steps, it is attached to a separately formed housing for accommodating an antenna base and a control circuit therein, and is fixed by a screw or the like, to complete a millimeter wave radar. Therefore, it is possible to provide a millimeter wave radar in which the layers can be integrally molded without complicating the structure or production step of the antenna base, in which it is easy to do positioning work between the antenna base and an electromagnetic wave absorbing layer, and which is inexpensive and excellent in weathering performance.

According to the present invention, it is possible to provide a millimeter wave radar which is light in weight, excellent in weathering performance, inexpensive, and excellent in detection performance.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A millimeter wave radar comprising:

an antenna base having a transmission-reception antenna;

a housing for fixing said antenna base; and a radome covering said antenna base;

wherein an electromagnetic wave absorbing layer is provided on the inside surface of said radome, wherein said electromagnetic wave absorbing layer has a gradient of impedance from the inside to the outside of said radome.

2. A millimeter wave radar comprising:

an antenna base having a transmission-reception antenna;

a housing for fixing said antenna base; and a radome covering said antenna base;

wherein an electromagnetic wave absorbing layer is provided on the inside surface of said radome, wherein said electromagnetic wave absorbing layer is comprised of a plurality of electromagnetic wave absorbing layers, and the impedance in each of said layers is lowered from the inside to the outside of said radome.

3. A millimeter wave radar comprising:

an antenna base having a transmission-reception antenna;

a housing for fixing said antenna base; and a radome covering said antenna base;

wherein an electromagnetic wave absorbing layer is provided on the inside surface of said radome, wherein said electromagnetic wave absorbing layer includes at least one of a carbon material and a hexagonal ferrite, and a material having an electric resistivity higher than that of said carbon material or said hexagonal ferrite.

4. The millimeter wave radar as set forth in claim 3, wherein said electromagnetic wave absorbing layer is a layer having a dielectric loss higher than that of said radome, or a magnetic loss layer.

5. The millimeter wave radar as set forth in claim 3, wherein a conductor layer is provided on the outside of said electromagnetic wave absorbing layer.

6. The millimeter wave radar as set forth in claim 5, wherein said conductor layer is a mesh.

7. The millimeter wave radar as set forth in claim 5, wherein said electromagnetic wave absorbing layer is embedded in at least a part of said radome.

8. The millimeter wave radar as set forth in claim 3, wherein said electromagnetic wave absorbing layer is provided with recesses and projections in its surface.

9. The millimeter wave radar as set forth in claim 3, wherein said electromagnetic wave absorbing layer is disposed inclinedly relative to the direction of normal to the plane of said antenna base.

10. The millimeter wave radar as set forth in claim 3, wherein said electromagnetic wave absorbing layer and a side surface portion of said radome provided with said electromagnetic wave absorbing layer are inclined relative to the direction of normal to the plane of said antenna base.

11. The millimeter wave radar as set forth in claim 10, wherein a front portion of said radome has an area not smaller than the area of said antenna base.

12. The millimeter wave radar as set forth in claim 3, wherein said material selected from at least one among the group consisting of carbon nanotube, carbon microcoil, shungite carbon, carbon black, exfoliated graphite, and carbon fiber.

13. The millimeter wave antenna as set forth in claim 3, wherein said material having the higher electric resistivity is selected from any one of a rubber, an insulating high molecular weight material, and an insulating inorganic material.

14. The millimeter wave radar as set forth in claim 3, wherein said electromagnetic wave absorbing layer includes said carbon material or said hexagonal ferrite whose content relative to said material having the higher electric resistivity is varied so that the characteristic impedance thereof is gradually lowered from the inside to the outside of said radome.

15. A millimeter wave antenna comprising:

an antenna base having a transmission-reception antenna;

a housing for fixing said antenna base; and a radome covering a front side of said antenna base;

wherein said radome is formed integral with an electromagnetic wave absorbing layer, wherein said electromagnetic wave absorbing layer includes at least one of a carbon material and a hexagonal ferrite, and a material having an electric resistivity higher than that of said carbon material or said hexagonal ferrite.

16. A method of making a millimeter wave antenna comprising the steps of:

injection molding a radome main body, and injection molding an electromagnetic wave absorbing layer on the inside surface of said radome main body to thereby form a radome; and positioning said radome with respect to a housing for accommodating an antenna base and a control circuit to fix said radome to the housing wherein said radome covers a front side of said antenna bases, wherein said electromagnetic wave absorbing layer includes carbon material or hexagonal ferrite, and a material having an electric resistivity higher than that of said carbon material or said hexagonal ferrite.

17. The method of producing a millimeter wave antenna as set forth in claim 16, wherein the radome forming step comprises the steps of injection molding said radome main body, forming a conductor layer on the inside surface of said radome main body, and providing said conductor layer further with an electromagnetic wave absorbing layer.

* * * * *